ary Examiner—Albert J. Makay
United States Patent [19]
Marschke

[11] 4,119,219
[45] Oct. 10, 1978

[54] BATCH FEEDER

[75] Inventor: Carl R. Marschke, Phillips, Wis.

[73] Assignee: Marquip, Inc., Phillips, Wis.

[21] Appl. No.: 772,763

[22] Filed: Feb. 28, 1977

[51] Int. Cl.² .............................................. B65G 59/02
[52] U.S. Cl. ............................. 214/8.5 A; 214/8.5 H;
 214/8.5 SS; 271/37
[58] Field of Search ............. 214/8.5 R, 8.5 A, 8.5 F,
 214/8.5 H, 8.5 SS, 8.5 G; 271/37

[56] References Cited
U.S. PATENT DOCUMENTS 3,067,885 12/1962 Kohler ............................... 214/8.5 A
3,749,257 7/1973 Yamashita ......................... 214/8.5 A

FOREIGN PATENT DOCUMENTS 2,313,294 12/1976 France ....................................... 214/8.5

Primary Examiner—Albert J. Makay
Assistant Examiner—George F. Abraham
Attorney, Agent, or Firm—Andrus, Sceales, Starke & Sawall

[57] ABSTRACT

The edges of the upper portion of a stack of sheets are driven horizontally into the high friction periphery of a rotating roll which raises the edge portions from the stack in succession. The rotating roll is then pivoted about an external axis until it is supportingly disposed under the raised batch. A second roll or roller is then lowered onto the batch so that the raised edge portion is confined between it and the lower rotating roll. A nip is thereby formed and the entire batch of sheets is then driven therethrough for use downstream.

18 Claims, 7 Drawing Figures

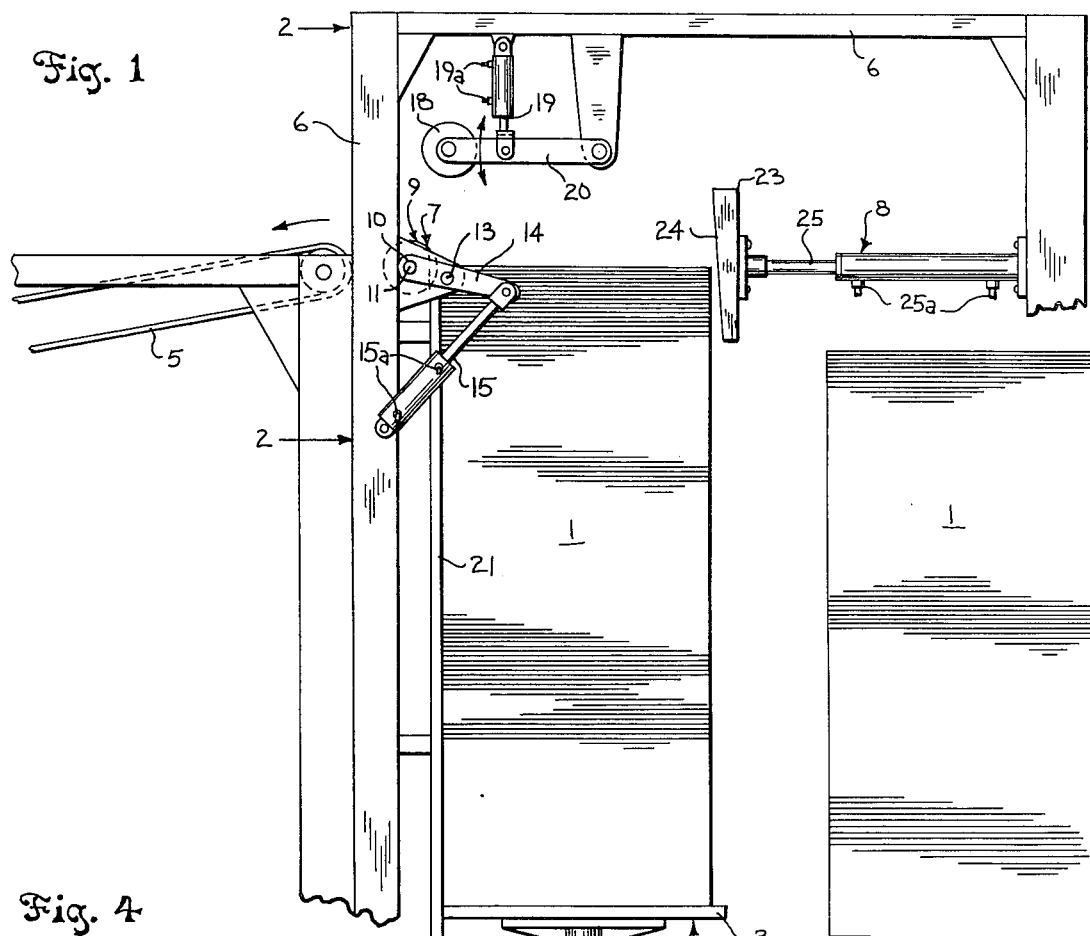
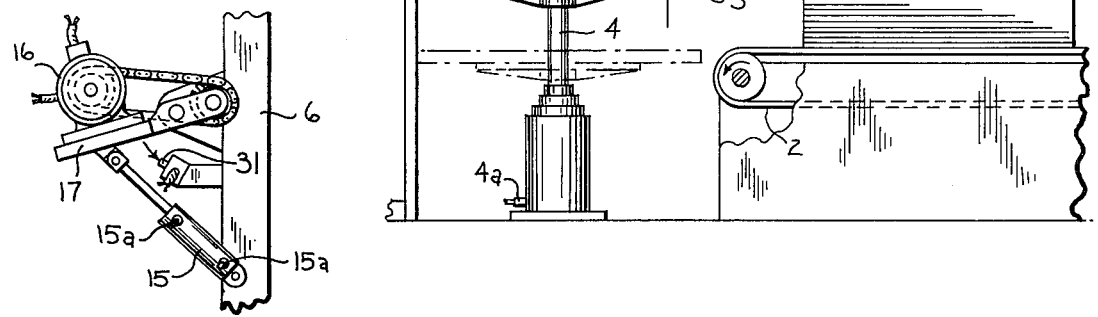
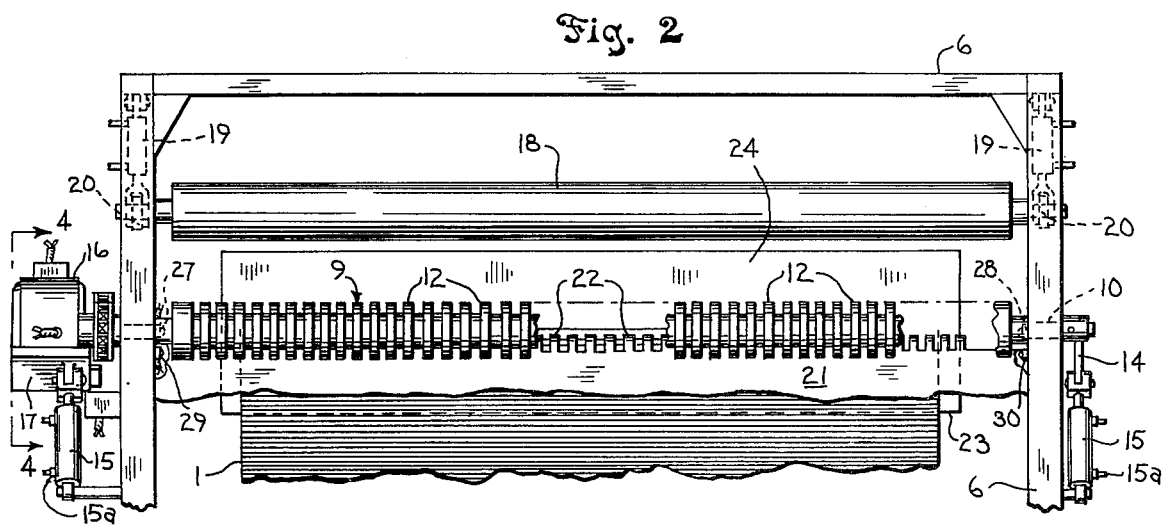

BATCH FEEDER

BACKGROUND AND SUMMARY OF THE INVENTION

This invention relates to a batch sheet feeder, and more particularly to a feeder for sheets of corrugated paperboard and the like.

In many manufacturing operations, it is often desirable to separate a batch of sheets from the top of a stack and feed the batch to a downstream hopper or machine for further operations. Such separation has often been done by hand. Mechanical batch separation has also been previously attempted, but the devices used have been complex and expensive.

The present invention is directed to a batch feeder which is relatively simple and inexpensive in its design, and which eliminates the need for manual batch separation.

In accordance with one aspect of the invention, the edges of the upper portion of a stack of horizontally extending vertically superimposed sheets are driven horizontally into the high friction periphery of a rotating roll which raises the edge portions from the stack in succession. The rotating roll is then pivoted about an external axis until it is supportingly disposed under the raised batch. The roll then frictionally drives the batch from atop the stack. In accordance with another aspect of the invention, a second roll or roller may be lowered onto the batch so that the raised edge portion thereof is confined between it and the lower rotating roll. A nip is thereby formed through which the entire batch of sheets is then driven.

BRIEF DESCRIPTION OF THE DRAWINGS

The accompanying drawings illustrate the best mode presently contemplated by the inventor for carrying out the invention.

In the drawings:

FIG. 1 is a generally schematic side elevation of a batch feeder constructed in accordance with the invention;

FIG. 2 is a fragmentary front elevation of the feeder, taken on line 2—2 of FIG. 1 and with parts broken away;

FIG. 4 is a view of the separator roll drive motor taken on line 4—4 of FIG. 2;

DESCRIPTION OF THE PREFERRED EMBODIMENT

Figure 3:
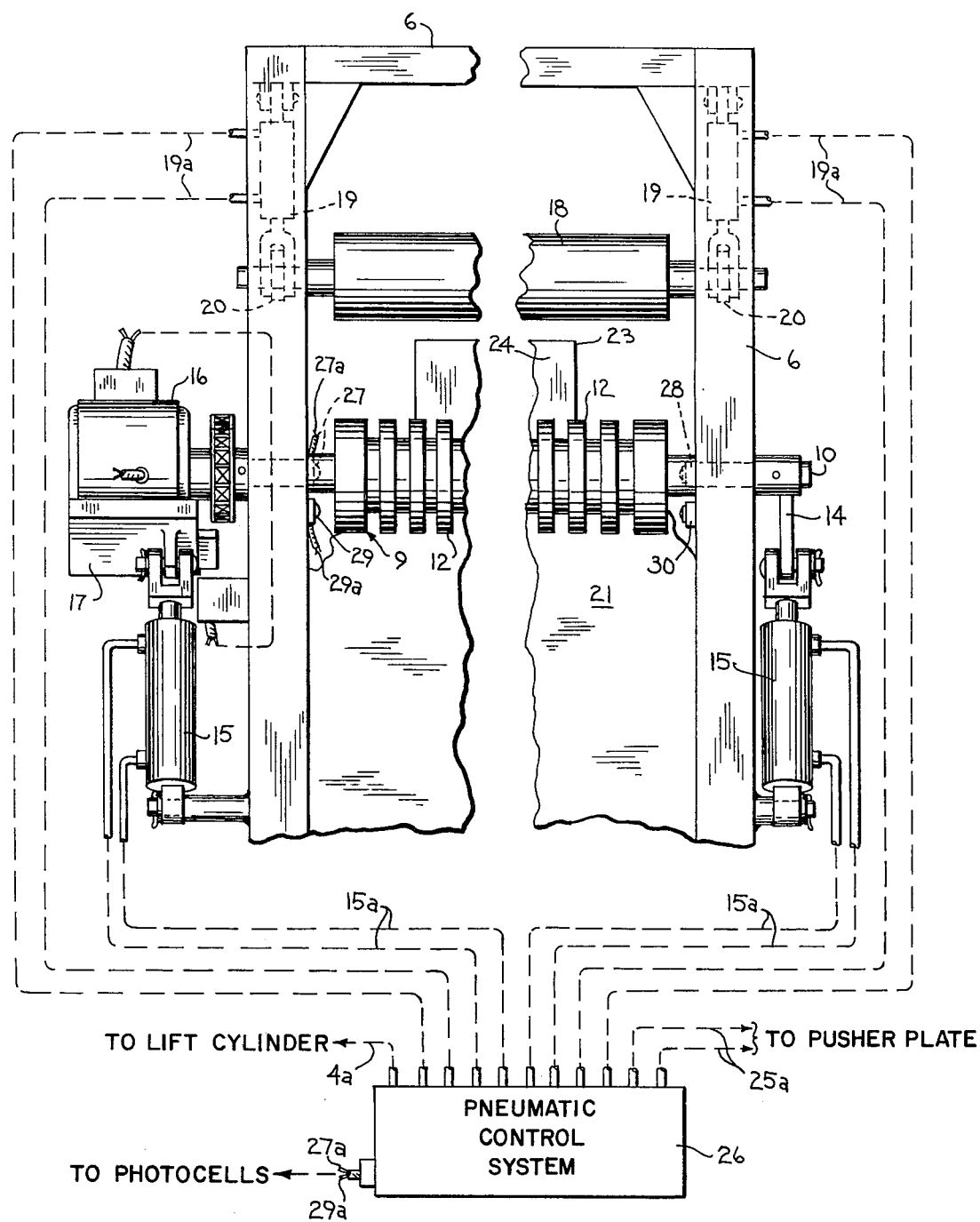
FIG. 3 is an enlarged fragmentary front elevation showing the batch feeder with its control system.

As shown in FIG. 1, the batch feeder of the invention is contemplated for use in handling a stack 1 of relatively flat planular individual sheets of material such as corrugated paperboard. Stack 1 may be fed to the feeder on a conveyor 2, where the stack is transferred to a pedestal 3 which is raisable by any suitable elevating means such as a piston 4. After each batch has been separated from the top of the stack, it is discharged onto a conveyor 5 which moves it downstream.

Referring to FIGS. 1-3, the batch feeder comprises a frame 6, a sheet separator mechanism 7 disposed generally above the front edge portion of the top of stack 1, and a sheet crowding mechanism 8 disposed at the rear edge portion of the top of the stack.

Sheet separator mechanism 7 is suitably mounted to frame 6 and comprises a horizontal elongated separator roll 9 mounted on a shaft 10 defining a roll axis 11. Roll 9 is shown as having a plurality of longitudinally spaced ring-like elements 12 thereon, for purposes to be described. Elements 12 have relatively high friction surface characteristics and may be made of urethane or the like.

Roll 9 is disposed above pedestal 3 and is normally disposed closely adjacent and at least partially forwardly of the front top edge of sheet stack 1, as shown in FIG. 1. The roll is adapted to be pivoted upwardly and rearwardly about an axis 13 which is external to the roll and spaced from axis 11. For this purpose, and in the present embodiment, levers 14 are mounted for pivoting about axis 13, with the outer ends of the levers carrying roll shaft 10 and the inner ends connected to pistons 15.

Means are provided to rotate roll 9 for purposes of sheet pick-up as will be described. In the embodiment shown, the roll rotating means comprises a two-speed electric motor 16 carried on a support arm 17 which in turn is connected to roll shaft 10 and mounted to pivot about axis 13. See FIGS. 3 and 4.

In accordance with one aspect of the invention, a supplemental nip-forming roller 18 may be mounted above stack 1 and roll 9. Roller 18 is adapted to be lowered toward roll 9 during operation of the device, as by a pair of pneumatic pistons 19 connected to a lever 20.

Figure 5:
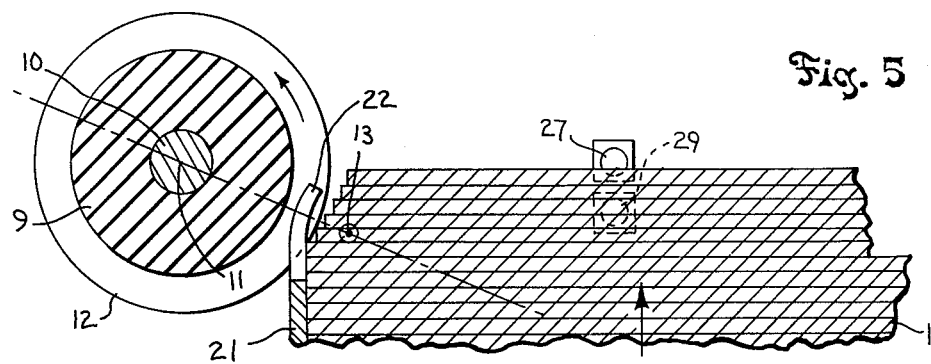
FIG. 5 is an enlarged schematic view showing the initial position of the rising stack of sheets and the separator roll.

Cooperating with the sheet separator mechanism 7 is a vertical stack guide plate 21 mounted to frame 6 and disposed directly in front of stack 1. As best seen in FIGS. 2 and 5, the upper end portion of plate 21 terminates in a plurality of longitudinally spaced rearwardly curved fingers 22 which enter the spaces or slots between high friction elements 12.

Sheet crowding mechanism 8 comprises a pusher member 23 having an upright front face 24 adapted to engage the upper trailing edge portion of stack 1. Face 24 may be inclined downwardly and rearwardly to maximize the crowding of the uppermost sheets in the stack.

Pusher member 23 is actuated to crowd the topmost sheets of stack 1 into separator mechanism 7, as by pneumatic pistons 25.

An automatic control system for the various above-described elements may be provided. For this purpose, a control apparatus 26 of any suitable well-known type is disposed in connection with the device. The apparatus is connected to the cylinders for pistons 4, 15, 19 and 25 through lines 4a, 15a, 19a and 25a respectively. In addition, a first photocell 27 and light source 28 are disposed on frame 6 slightly rearwardly of the lowered roller 9 and generally in line with axis 11. Photocell 27 is connected to apparatus 26 by wires 27a and is responsive to interference of the light beam from light 28 by the raising stack 1 to deactivate stack raising piston 4 and activate crowding pistons 25. A second photocell 29 and light source 30 are also disposed on frame 6 and below the first photocell and light source. Photocell 29 is connected to apparatus 26 by wires 29a and is responsive to the presence of the light beam from light 30 after the interference of this beam by the stack 1 to activate roll pivoting pistons 15 and nip roller pistons 19 and deactivate crowding pistons 25.

Furthermore, pivoting of separator roll 9 about axis 13 causes its drive motor 16 to also pivot about the axis and to engage a control switch button 31 to thereby cause the motor to go from low to high drive speed.

The basic operation of the device will now be described.

Stack 1 is positioned on pedestal 3 and piston 4 is actuated to raise the stack along guide plate 21. Crowding pistons 25 are deactivated and pusher 23 is spaced back from the stack. Separator roll 9 is in its normal forward position and rotating at slow speed and so that its periphery facing stack 1 is moving upwardly.

Referring to FIG. 5, continued raising of stack 1 causes the topmost sheets thereof to engage rotating roll 9 and be kicked rearwardly. Since the trailing edges of these sheets are not confined at this point, the sheets are free to move slightly rearwardly.

Figure 6:
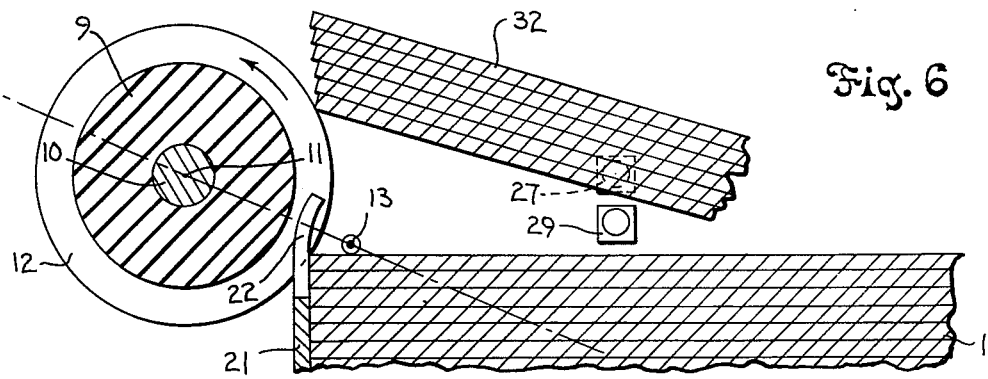
FIG. 6 is a view similar to FIG. 5 and showing the batch initially raised from the stack.

When the topmost sheet in the raising stack blocks the light from light 28, photocell 27 causes piston 4 to stop raising the stack and pistons 25 to drive pusher face 24 into the upper part of the stack. As this occurs, the front edge of the top-most sheet forceably engages rotating roll 9, and is lifted thereby. Since the periphery of roll 9 curves toward pusher 23, the distance between the roll periphery and the pusher shortens as the top sheet edge rises, thus increasing the grip of the sheet edges and supplementing the high friction roll surface. Thus, the top sheet edge is prevented from dropping and is positively thrust upwardly on an incline. The second sheet follows along in the same manner, serving to lift the top-most sheet out of contact with roll 9, and releasing the gripping pressure on the top sheet. Subsequent sheets follow one-by-one in succession until an inclined batch 32 of sheets has been created which is angularly separated from the stack and is supported on the bottom sheet edge by roll 9. See FIG. 6.

Figure 7:
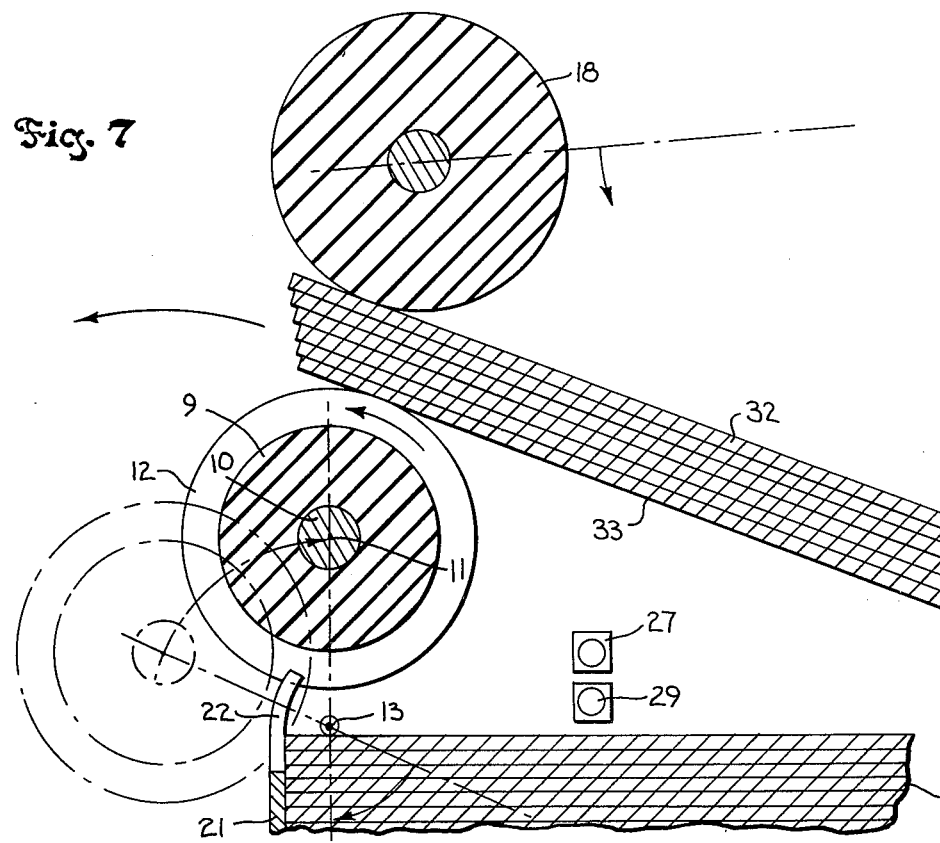
FIG. 7 is a view similar to FIGS. 5 and 6 and showing the final position of the lower roll and upper roller with the batch of sheets about to be fed through the nip.

When batch 32 reaches its uppermost position, the light to photocell 29 is no longer blocked, automatically causing crowding pistons 25 to stop, and roll pivoting pistons 15 to pivot roll 9 about axis 13 so that the roll shifts upwardly and rearwardly beneath the leading edge of batch 32 to lift the latter even further and support the lower face 33 thereof. See FIG. 7. In addition, in the present embodiment, nip roller pistons 19 are caused to lower roller 18 onto the top of the batch and motor 16, which has been driving roll 9 at slow speed, now switches to high speed in response to pivoting of support arm 17 downwardly against motor speed control switch button 31 (FIG. 4). Roll 9 therefor increases in speed and drives batch 32 forwardly, through a nip in this case, to thereby completely remove it from atop the stack.

The elements may then be returned to their initial positions in preparation for forming the next batch.

The invention provides a unique concept in batch formation and feeding. By using a rotating separator roll with a friction surface to raise the leading sheet edges in succession, it has been found that misaligned sheets in the stack will be squared and warped sheets will be picked up with little difficulty.

Various modes of carrying out the invention are contemplated as being within the scope of the following claims particularly pointing out and distinctly claiming the subject matter which is regarded as the invention.

I claim:

1. In a batch feeder for first separating a plurality of planular sheets from the top of a stack of horizontally extending vertically superimposed individual sheets and then feeding the separated sheets to a conveyor or the like:
   (a) elevating means to raise the stack,
   (b) separator means disposed above said elevating means for engaging and lifting the leading edges of the topmost individual sheets in the stack one-by-one in succession to form an inclined batch of individual sheets,
   (c) and shifting means to move said separator means to beneath the formed batch to support the leading edge portion of the inclined batch,
   (d) said separator means also forming means to drivingly remove said batch from atop the stack.

2. The batch feeder of claim 1:
   (a) which includes means movable downwardly into engagement with the top surface of the leading edge portion of the batch for pressing the latter against said separator means,
   (b) and wherein said separator means forms means to drive said batch forwardly from between the separator means and said pressing means.

3. The batch feeder of claim 1:
   (a) wherein said separator means comprises a roll extending along the forward top edge of the stack,
   (b) said roll having a high friction surface thereon for engagement by leading edges of the topmost sheets in succession,
   (c) and motive means to rotate said roll so that its periphery facing the stack moves upwardly to thereby lift the said sheet edges from the stack.

4. In the batch feeder of claim 3: crowding means for pushing the said topmost sheets toward said roll so that the sheets are gripped therebetween.

5. The batch feeder of claim 4 in which said crowding means comprises:
   (a) a pusher member disposed adjacent the trailing edge of the stack,
   (b) and means to drive said pusher member to move said topmost sheets forwardly.

6. The batch feeder of claim 4:
   (a) in which said crowding means includes a pusher member disposed adjacent the trailing edge of the stack,
   (b) said pusher member having a forward face which is inclined downwardly and rearwardly.

7. The batch feeder of claim 3 wherein rotation of said separator roll by said motive means serves to drive said batch forwardly from atop said stack.

8. The batch feeder of claim 2 in which said pressing means comprises:
   (a) a nip forming roller normally spaced above the top of the stack,
   (b) and means to shift said roller downwardly into engagement with the top of the formed batch to form, with said separator roll, a nip confining said batch.

9. In the batch feeder of claim 1: means responsive to the formation of the said inclined batch to automatically actuate said shifting means.

10. The batch feeder of claim 9 wherein said actuating means is responsive to the height of the said batch.

11. In a batch feeder for first separating a plurality of sheets from the top of a stack and then feeding the separated sheets to a conveyor or the like:
   (a) elevating means to raise the stack,
   (b) separator means disposed above said elevating means for engaging and lifting the leading edges of the topmost sheets in the stack one-by-one in succession to form an inclined batch,
   (c) said separator means comprising a roll mounted on a first axis and with said roll extending along the forward top edge of the stack,
   (d) said roll having a high friction surface thereon for engagement by the leading edges of the topmost sheets in succession,
   (e) motive means to rotate said roll so that its periphery facing the stack moves upwardly to thereby lift the said sheet edges from the stack,
   (f) and shifting means to move said separator means to beneath the formed batch to support the leading edge portion of the inclined batch,
   (g) said shifting means forming means to pivot said roll about a second axis external to the roll and rearwardly and upwardly beneath the said batch of sheets,
   (h) said separator means also forming means to drivingly remove said batch from atop the stack.

12. In a batch feeder for first separating a plurality of sheets from the top of a stack and then feeding the separated sheets to a conveyor or the like:
   (a) elevating means to raise the stack,
   (b) separator means disposed above said elevating means for engaging and lifting the leading edges of the topmost sheets in the stack one-by-one in succession to form an inclined batch,
   (c) said separator means comprising a roll extending along the forward top edge of the stack,
   (d) said roll having a high friction surface thereon for engagement by the leading edges of the topmost sheets in succession,
   (e) motive means to rotate said roll so that its periphery facing the stack moves upwardly to thereby lift the said sheet edges from the stack,
   (f) shifting means to move said separator means to beneath the formed batch to support the leading edge portion of the inclined batch,
   (g) rotation of said roll by said motive means serving to drive said batch forwardly from atop said stack,
   (h) and control means to actuate said motive means to rotate said roll at a higher speed during forward driving of the said batch by said roll then during sheet separation.

13. In a batch feeder for first separating a plurality of sheets from the top of a stack and then feeding the separated sheets to a conveyor or the like:
   (a) elevating means to raise the stack,
   (b) separator means disposed above said elevating means for engaging and lifting the leading edges of the topmost sheets in the stack one-by-one in succession to form an inclined batch,
   (c) said separator means comprising a roll extending along the forward top edge of the stack,
   (d) said roll having a high friction surface thereon for engagement by the leading edges of the topmost sheets in succession,
   (e) motive means to rotate said roll so that its periphery facing the stack moves upwardly to thereby lift the said sheet edges from the stack,
   (f) shifting means to move said separator means to beneath the formed batch to support the leading edge portion of the inclined batch,
   (g) said separator means also forming means to drivingly remove said batch from atop the stack,
   (h) slots formed on the periphery of said separator roll,
   (i) a vertical stack guide plate disposed generally beneath said roll,
   (j) and a plurality of fingers disposed on the upper end portion of said plate and with said fingers entering said slots adjacent said sheets,
   (k) said fingers being rearwardly curved and serving as means to prevent said sheets from being driven beneath the rotating roll.

14. In a batch feeder for first separating a plurality of sheets from the top of a stack and then feeding the separated sheets to a conveyor or the like:
   (a) elevating means to raise the stack,
   (b) separator means disposed above said elevating means for engaging and lifting the leading edges of the topmost sheets in the stack one-by-one in succession to form an inclined batch,
   (c) said separator means comprising a roll extending along the forward top edge of the stack,
   (d) said roll having a high friction surface thereon for engagement by the leading edges of the topmost sheets in succession,
   (e) motive means to rotate said roll so that its periphery facing the stack moves upwardly to thereby lift the said sheet edges from the stack,
   (f) shifting means to move said separator means to beneath the formed batch to support the leading edge portion of the inclined batch,
   (g) said separator means also forming means to drivingly remove said batch from atop the stack,
   (h) crowding means for pushing the said topmost sheets toward said roll so that the sheets are gripped therebetween,
   (i) rotation of said roll by said motive means serving to drive said batch forwardly from atop said stack,
   (j) and control means to actuate said motive means to rotate said roll at a higher speed during forward driving of the said batch by said roll than during sheet separation,
   (k) said stack elevating means and said crowding means being responsive to raising of said stack.

15. In a batch feeder for first separating a plurality of sheets from the top of a stack and then feeding the separated sheets to a conveyor or the like:
   (a) elevating means to raise the stack,
   (b) separator means disposed above said elevating means for engaging and lifting the leading edges of the topmost sheets in the stack one-by-one in succession to form an inclined batch,
   (c) said separator means comprising a roll extending along the forward top edge of the stack,
   (d) said roll having a high friction surface thereon for engagement by the leading edges of the topmost sheets in succession,
   (e) motive means to rotate said roll so that its periphery facing the stack moves upwardly to thereby lift the said sheet edges from the stack,
   (f) shifting means to move said separator means to beneath the formed batch to support the leading edge portion of the inclined batch,
   (g) said separator means also forming means to drivingly remove said batch from atop the stack, (h) crowding means for pushing the said topmost sheets toward said roll so that the sheets are gripped therebetween, (i) rotation of said roll by said motive means serving to drive said batch forwardly from atop said stack, (j) and control means to actuate said motive means to rotate said roll at a higher speed during forward driving of the said batch by said roll than during sheet separation, (k) said control means and said shifting means being automatically responsive to the height of said inclined batch.

16. In a batch feeder for first separating a plurality of sheets from the top of a stack and then feeding the separated sheets to a conveyor or the like:

(a) a separator roll mounted on a first axis and with said roll extending along the forward top edge of the stack and having a high friction surface, (b) motive means to rotate said roll about said first axis so that its periphery facing the stack moves upwardly to thereby lift the leading edges of the topmost sheets in the stack one-by-one in succession to form an inclined batch, (c) and means to pivot said roll about a second axis external to the roll and rearwardly and upwardly beneath the said inclined batch of sheets to thereby support said batch.

17. In a batch feeder for first separating a plurality of sheets from the top of a stack and then feeding the separated sheets to a conveyor or the like:

(a) a separator roll extending along the forward top edge of the stack and having a high friction surface, (b) motive means to rotate said roll so that its periphery facing the stack moves upwardly to thereby lift the leading edges of the topmost sheets in the stack one-by-one in succession to form an inclined batch, (c) rotation of said roll by said motive means serving to drive said batch forwardly from atop said stack, (d) and control means to actuate said motive means to rotate said roll at a higher speed during forward driving of the said batch by said roll than during sheet separation.

18. In a batch feeder for first separating a plurality of sheets from the top of a stack and then feeding the separated sheets to a conveyor or the like:

(a) a separator roll extending along the forward top edge of the stack and having a high friction surface, (b) motive means to rotate said roll so that its periphery facing the stack moves upwardly to thereby lift the leading edges of the topmost sheets in the stack one-by-one in succession to form an inclined batch, (c) slots formed on the periphery of said separator roll, (d) a vertical stack guide plate disposed generally beneath said roll, (e) and a plurality of fingers disposed on the upper end portion of said plate and with said fingers entering said slots adjacent said sheets, (f) said fingers being rearwardly curved and serving as means to prevent said sheets from being driven beneath the rotating roll.

* * * * *